United States Patent
Alexeev et al.

(10) Patent No.: US 11,429,318 B2
(45) Date of Patent: Aug. 30, 2022

(54) REDIRECT-ON-WRITE SNAPSHOT MECHANISM WITH DELAYED DATA MOVEMENT

(71) Applicant: EMC IP Holding Company LLC, Hopkinton, MA (US)

(72) Inventors: Sergey Alexandrovich Alexeev, St. Petersburg (RU); Alexey Vladimirovich Shusharin, Saint Petersburg (RU); Dmitry Tylik, Westborough, MA (US); Yakov Stanislavovich Belikov, Saint Petersburg (RU); Ekaterina Konstantinovna Sigalova, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 121 days.

(21) Appl. No.: 16/526,328

(22) Filed: Jul. 30, 2019

(65) Prior Publication Data
US 2021/0034303 A1   Feb. 4, 2021

(51) Int. Cl.
*G06F 3/06* (2006.01)
*G06F 11/14* (2006.01)

(52) U.S. Cl.
CPC .......... *G06F 3/0665* (2013.01); *G06F 3/0611* (2013.01); *G06F 3/0644* (2013.01); *G06F 3/0653* (2013.01); *G06F 11/1446* (2013.01); *G06F 11/1469* (2013.01); *G06F 3/0679* (2013.01)

(58) Field of Classification Search
None
See application file for complete search history.

(56) References Cited

U.S. PATENT DOCUMENTS

| | | |
|---|---|---|
| 8,250,033 B1 | 8/2012 | De Souter et al. |
| 9,235,535 B1 | 1/2016 | Shim et al. |
| 9,665,306 B1 | 5/2017 | Patwardhan |
| 9,830,105 B1 | 11/2017 | Tummala et al. |
| 9,830,228 B1 | 11/2017 | Chopra et al. |
| 9,971,655 B1 | 5/2018 | Li et al. |
| 10,031,703 B1 * | 7/2018 | Natanzon ............. G06F 3/0685 |
| 10,146,637 B1 | 12/2018 | Chopra et al. |
| 10,176,183 B1 | 1/2019 | Shim et al. |
| 10,254,970 B1 | 4/2019 | Martin et al. |

(Continued)

*Primary Examiner* — Kaushikkumar M Patel
(74) *Attorney, Agent, or Firm* — BainwoodHuang

(57) ABSTRACT

Techniques include receiving a backup request for backing up data on a production VVOL, to which is assigned physical space from storage devices in a first storage tier. When the production VVOL and a snapshot VVOL exist, and a write request is received to a data block on the production VVOL that is shared between the production VVOL and the snapshot VVOL, then the techniques include capturing a snapshot of the production VVOL by redirecting the write request to newly allocated space on the production VVOL, writing new data to the newly allocated space, and storing metadata referring to the original block(s) on the production VVOL. Based on an IO workload threshold, the techniques include copying, in a background process, the original version of the modified block from the production VVOL to a snapshot VVOL, to which is assigned physical storage space from storage devices in a second storage tier.

12 Claims, 5 Drawing Sheets

(56) References Cited

U.S. PATENT DOCUMENTS

| | | |
|---|---|---|
| 10,289,494 B1 | 5/2019 | Chopra et al. |
| 10,353,616 B1 | 7/2019 | Tao et al. |
| 10,585,752 B1 | 3/2020 | Chopra et al. |
| 10,853,111 B1* | 12/2020 | Gupta ................... G06F 8/65 |
| 2012/0036327 A1* | 2/2012 | Jennas, II ............ G06F 3/0685 |
| | | 711/137 |
| 2012/0284309 A1* | 11/2012 | Adkins ................ G06F 3/0607 |
| | | 707/782 |
| 2015/0067231 A1* | 3/2015 | Sundarrajan .......... G06F 3/0685 |
| | | 711/103 |
| 2016/0077926 A1* | 3/2016 | Mutalik ............. G06F 11/1453 |
| | | 711/162 |
| 2017/0083250 A1* | 3/2017 | Beeken ................ G06F 3/0619 |
| 2018/0356989 A1* | 12/2018 | Meister ................ G06F 3/0649 |
| 2019/0034119 A1* | 1/2019 | Bhagwat .................. G06F 3/061 |
| 2019/0050163 A1* | 2/2019 | Dewey ................ G06F 3/0665 |
| 2019/0163763 A1* | 5/2019 | Pandey ................ G06F 11/301 |
| 2020/0065195 A1* | 2/2020 | Benboubakeur .... G06F 11/1458 |

\* cited by examiner

REDIRECT-ON-WRITE SNAPSHOT MECHANISM WITH DELAYED DATA MOVEMENT

BACKGROUND

Data storage systems include storage processing circuitry coupled to arrays of non-volatile storage devices, such as, for example, solid state drives (SSDs), hard disk drive (HDDs), optical drives, and so on. The storage processing circuitry is configured to service host-generated storage input/output (IO) requests, which specify data blocks, data pages, data files, and/or other data elements to be written to, read from, created on, and/or deleted from virtual volumes (VVOLs), logical units (LUs), file systems, and/or any other suitable storage objects residing on the respective non-volatile storage devices. Such storage processing circuitry is further configured to execute software programs for managing the storage IO requests (e.g., write requests, read requests), and for performing various processing tasks to organize and/or secure the data blocks, data pages, data files, and/or other data elements on the respective non-volatile storage devices.

SUMMARY

At regular or periodic intervals, a data storage system may receive a request for performing a full or incremental backup of at least some of the data stored on the data storage system. Once such a backup request is received, the data storage system can perform a backup operation, which can include capturing a snapshot of the stored data, possibly while continuing to receive host-generated storage IO requests (e.g., write requests, read requests). To assure data integrity as it performs the backup operation, the data storage system can perform what is known as a "copy-on-write" operation. For example, when a backup request is received on a storage object (e.g., a production volume), the copy-on-write operation can capture a snapshot of the production volume by storing, in a data structure for the snapshot (e.g., a block map), metadata that refers to the original data blocks on the production volume. When both the production volume and a snapshot volume exist, and a write request is received to a data block on the production volume that is shared between the production volume and the snapshot volume, then the copy-on-write operation can capture a snapshot of the production volume by copying the original data block that is subject to being modified to the snapshot volume, writing new data to the original data block on the production volume, and storing, in the block map for the snapshot, metadata that refers to the original, unmodified data block(s) on the production volume, as well as metadata that refers to the copy of the original data block on the snapshot volume.

Data integrity can also be assured during a backup operation by performing what is known as a "redirect-on-write" operation. For example, like the copy-on-write operation, when a backup request is received on a storage object (e.g., a production volume), the redirect-on-write operation can capture a snapshot of the production volume by storing, in a block map for the snapshot, metadata that refers to the original data blocks on the production volume. However, unlike the copy-on-write operation, when both the production volume and a snapshot volume exist, and a write request is received to a data block on the production volume that is shared between the production volume and the snapshot volume, then the redirect-on-write operation can capture a snapshot of the production volume by redirecting the write request to newly allocated space for a data block on the production volume, writing new block data to the newly allocated space, and storing, in the block map for the snapshot, metadata that refers to the original, unmodified data block(s) on the production volume. By avoiding having to perform an extra write (i.e., copy) operation to move block data from the production volume to a snapshot volume, the redirect-on-write operation can have less of a performance impact than the copy-on-write operation.

Unfortunately, there are advantages but also disadvantages to performing copy-on-write operations and redirect-on-write operations in a data storage system. For example, although a copy-on-write operation has the disadvantage of a performance impact due to the need to perform an extra write (i.e., copy) operation, it has the advantage of allowing production and snapshot volumes to be associated with different tiers, grades, or levels of data storage, thereby allowing a user of the data storage system to specify different service level objectives for production and snapshot data. Moreover, although a redirect-on-write operation has the advantage of mitigating the performance impact of the copy-on-write operation, it has the disadvantage of requiring production and snapshot data to share the same storage extent, making it difficult if not impossible for the user of the data storage system to satisfy desired service level objectives for the production and snapshot data.

Techniques are disclosed herein for performing backup operations in a data storage system, taking into account desired service level objectives for production and snapshot data. Such a data storage system can include storage processing circuitry configured to execute service level agreement (SLA) logic and snapshot logic out of a memory. The data storage system can further include a pool of storage devices that includes a set of storage tiers, which are associated with storage devices that have different performance capabilities and/or costs. The storage processing circuitry can receive, from a data storage administrator, a first storage policy profile for production data and a second storage policy profile for snapshot data, as specified by a service level agreement (SLA). For example, the first storage policy profile can specify desired capabilities for provisioned storage for a production virtual volume (VVOL), and the second storage policy profile can specify desired capabilities for provisioned storage for a snapshot virtual volume (VVOL). Having received the first and second storage policy profiles for the production and snapshot data, respectively, the storage processing circuitry can execute the SLA logic to assign storage space from one or more storage devices in a first storage tier to the production VVOL, and assign storage space from one or more storage devices in a second storage tier to the snapshot VVOL. For example, the first storage tier can correspond to a "gold" storage tier that provides a specified quality of service (QoS) level, and the second storage tier can correspond to a "bronze" storage tier that provides a specified QoS level that is lower than the QoS level provided by the gold storage tier.

The storage processing circuitry can receive, from a data storage administrator, a backup request for performing a full or incremental backup of at least some of the data stored on the production VVOL. When the backup request is received on the production VVOL, the storage processing circuitry can execute the snapshot logic to capture a snapshot of the production VVOL by storing, in a block map for the snapshot, metadata that refers to the original data blocks on the production VVOL (to which was assigned storage space from the storage devices in the gold storage tier). When both the production VVOL and a snapshot VVOL exist, and a write request is received to a data block on the production VVOL that is shared between the production VVOL and the snapshot VVOL, then the storage processing circuitry can execute the snapshot logic to capture a snapshot of the production VVOL by redirecting the write request to newly allocated space for a data block on the production VVOL, writing new data to the newly allocated space for the data block, and storing, in the block map for the snapshot, metadata that refers to the original, unmodified data block(s) on the production VVOL. In addition, based at least on an IO workload (e.g., a write IO workload, a read IO workload) of the data storage system, the storage processing circuitry can execute the snapshot logic to copy, in a background process, at least the original version of the modified data block from the production VVOL to the snapshot VVOL (to which was assigned storage space from the storage devices in the bronze storage tier), and store, in the block map for the snapshot, metadata that refers to the original version of the modified data block on the snapshot VVOL. In this way, desired service level objectives for the production data and the snapshot data can be satisfied, while mitigating the performance impact of an extra write (i.e., copy) operation.

In certain embodiments, a method of performing a backup operation in a data storage system includes receiving a backup request for performing a backup of data on a production volume in a first storage tier, redirecting a write request to a data element on the production volume in the first storage tier to allocated space for another data element on the production volume in the first storage tier, and copying, in a background process, original data of the data element on the production volume in the first storage tier to allocated space for a data element on a derivative volume (e.g., a snapshot volume, a full clone volume, a fast clone volume) in a second storage tier.

In certain arrangements, the method includes storing, in a block map for the derivative volume, metadata that refers to the data element on the derivative volume in the second storage tier.

In certain arrangements, the method includes storing, in a block map for the production volume, metadata that refers to the data element on the production volume in the first storage tier.

In certain arrangements, the method includes obtaining a storage policy profile specifying a service level objective for the production volume, and obtaining a storage policy profile specifying a service level objective for the derivative volume.

In certain arrangements, the method includes assigning, to the production volume, storage space from at least one storage device in the first storage tier based on the service level objective for data stored on the production volume, and assigning, to the derivative volume, storage space from at least one storage device in the second storage tier based on the service level objective for data stored on the derivative volume.

In certain arrangements, the method includes monitoring an input/output (IO) workload of the data storage system.

In certain arrangements, the method includes determining whether the IO workload of the data storage system is less than a predetermined threshold.

In certain arrangements, the method includes copying the original data of the data element on the production volume to the data element on the derivative volume in response to determining that the IO workload is less than (or equal to) the predetermined threshold.

In certain embodiments, a data storage system includes a memory, and processing circuitry configured to execute program instructions out of the memory to receive a backup request for performing a backup of data on a production volume in a first storage tier, to redirect a write request to a data element on the production volume in the first storage tier to allocated space for another data element on the production volume in the first storage tier, and to copy, in a background process, original data of the data element on the production volume in the first storage tier to allocated space for a data element on a derivative volume (e.g., a snapshot volume, a full clone volume, a fast clone volume) in a second storage tier.

In certain embodiments, a computer program product includes a set of non-transitory, computer-readable media having instructions that, when executed by control circuitry of a computerized apparatus, cause the control circuitry to perform a method of performing a backup operation in a data storage system, in which the method includes receiving a backup request for performing a backup of data on a production volume in a first storage tier, redirecting a write request to a data element on the production volume in the first storage tier to allocated space for another data element on the production volume in the first storage tier, and copying, in a background process, original data of the data element on the production volume in the first storage tier to allocated space for a data element on a derivative volume (e.g., a snapshot volume, a full clone volume, a fast clone volume) in a second storage tier.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views.

DETAILED DESCRIPTION

Techniques are disclosed herein for performing backup operations in data storage systems, taking into account desired service level objectives for production and snapshot data. The disclosed techniques can include receiving a backup request for performing a full or incremental backup of at least some data stored on a production virtual volume (VVOL), to which is assigned storage space from storage devices in a first storage tier. When both the production VVOL and a snapshot VVOL exist, and a write request is received to a data block on the production VVOL that is shared between the production VVOL and the snapshot VVOL, then the disclosed techniques can include capturing a snapshot of the production VVOL by redirecting the write request to newly allocated space for a data block on the production VVOL, writing new block data to the newly allocated space, and storing, in a block map for the snapshot, metadata that refers to the original, unmodified data block(s) on the production VVOL. In addition, based at least on an IO workload (e.g., a write IO workload, a read IO workload) of the data storage system, the disclosed techniques can include copying, in a background process, at least the original version of the modified data block from the production VVOL to a snapshot VVOL, to which is assigned storage space from storage devices in a second storage tier, and storing, in the block map for the snapshot, metadata that refers to the original version of the modified data block on the snapshot VVOL. In this way, the desired service level objectives for production data and snapshot data can be satisfied, while mitigating the performance impact of an extra write (i.e., copy) operation.

Figure 1:
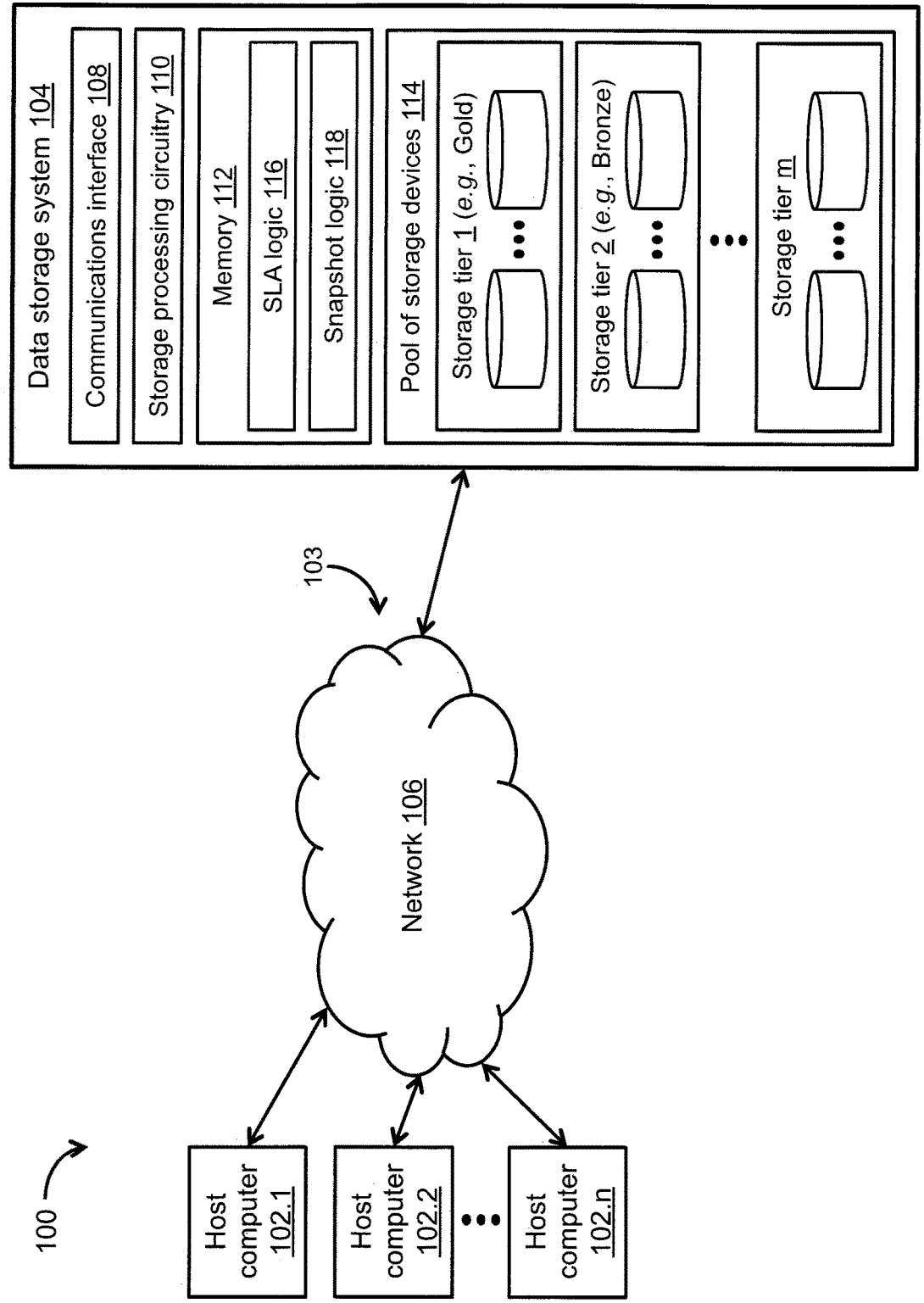
FIG. 1 is a block diagram of an exemplary storage environment, in which techniques can be practiced for performing backup operations in a data storage system, taking into account desired service level objectives for production and snapshot data.

FIG. 1 depicts an illustrative embodiment of an exemplary storage environment 100, in which techniques can be practiced for performing backup operations in a data storage system, taking into account desired service level objectives for production and snapshot data. As shown in FIG. 1, the storage environment 100 can include a plurality of host computers 102.1, 102.2, . . . , 102.n, a data storage system 104, and a communications medium 103 that includes at least one network 106. For example, each of the plurality of host computers 102.1, . . . , 102.n can be configured as a web server computer, a file server computer, an email server computer, an enterprise server computer, or any other suitable client or server computer or computerized device. The plurality of host computers 102.1, . . . , 102.n can be configured to provide, over the network 106, storage input/output (IO) requests (e.g., small computer system interface (SCSI) commands, network file system (NFS) commands) to the data storage system 104. For example, such storage IO requests (e.g., write requests, read requests) can direct the data storage system 104 to write and/or read data blocks, data pages, data files, and/or other data elements (also referred to herein as "host data") to/from virtual volumes (VVOLs; e.g., VMware® virtual volumes), logical units (LUs), file systems, and/or any other suitable storage objects maintained in association with the data storage system 104.

The communications medium 103 can be configured to interconnect the plurality of host computers 102.1, . . . , 102.n with the data storage system 104 to enable them to communicate and exchange data and/or control signaling. As shown in FIG. 1, the communications medium 103 is illustrated as a "cloud" to represent different communications topologies such as a backbone topology, a hub-and-spoke topology, a loop topology, an irregular topology, and so on, or any suitable combination thereof. As such, the communications medium 103 can include copper based data communications devices and cabling, fiber optic based communications devices and cabling, wireless communications devices, and so on, or any suitable combination thereof. The communications medium 103 can be configured to support storage area network (SAN) communications, network attached storage (NAS) communications, local area network (LAN) communications, metropolitan area network (MAN) communications, wide area network (WAN) communications, wireless communications, distributed infrastructure communications, and/or any other suitable communications.

The data storage system 104 can include a communications interface 108, storage processing circuitry 110, a memory 112, and a pool of storage devices 114. The communications interface 108 can include SCSI target adapters, network interface adapters, and/or any other suitable adapters for converting electronic, optical, and/or wireless signals received over the network 106 to a form suitable for use by the storage processing circuitry 110. The memory 112 can include persistent memory (e.g., flash memory, magnetic memory) and non-persistent memory (e.g., dynamic random access memory (DRAM), static random access memory (SRAM)). Further, the memory 112 can accommodate specialized software constructs including service level agreement (SLA) logic 116 and snapshot logic 118. The storage processing circuitry 110 can include one or more physical storage processors or engines executing specialized logic/software, data movers, director boards, blades, IO modules, storage drive controllers, switches, and/or any other suitable computer hardware or combination thereof. For example, the storage processing circuitry 110 can execute the specialized software constructs as program instructions out of the memory 112, process storage IO requests (e.g., write requests, read requests) provided by the respective host computers 102.1, . . . , 102.n, and store host data in any suitable storage environment (e.g., a redundant array of independent disks (RAID) environment) implemented by the pool of storage devices 114.

In the context of the storage processing circuitry 110 being implemented using one or more processors executing specialized logic/software, a computer program product can be configured to deliver all or a portion of the specialized software constructs to the respective processor(s). Such a computer program product can include one or more non-transient computer-readable storage media, such as a magnetic disk, a magnetic tape, a compact disk (CD), a digital versatile disk (DVD), an optical disk, a flash drive, a solid state drive (SSD), a secure digital (SD) chip or device, an application specific integrated circuit (ASIC), a field programmable gate array (FPGA), and so on. The non-transient computer-readable storage media can be encoded with sets of instructions that, when executed by the respective processor(s), perform the various techniques disclosed herein.

The pool of storage devices 114 can include multiple storage devices organized into a plurality of tiers, grades, or levels, such as a storage tier "1" and a storage tier "2", possibly up to and including a storage tier "m". The respective storage tiers 1, . . . , m can be associated with storage devices that provide different quality of service (QoS) levels, performance capabilities, and/or costs. For example, the storage tier 1 can correspond to a "gold" storage tier associated with high cost, high performance, flash-based storage devices that provide a high level of QoS. Further, the storage tier 2 can correspond to a "bronze" storage tier associated with lower cost, lower performance, hard disk-based storage devices that provide a lower level of QoS.

The SLA logic 116 can be configured to assign, based on a service level objective for the production data, storage space from one or more storage devices in a first storage tier (e.g., the storage tier 1) to a production virtual volume (VVOL), as well as assign, based on a service level objective for the snapshot data, storage space from one or more storage devices in a second storage tier (e.g., the storage tier 2) to a snapshot VVOL. The service level objective for the production data can be specified by a storage policy profile for the production VVOL. Likewise, the service level objective for the snapshot data can be specified by a storage policy profile for the snapshot VVOL. For example, a data storage administrator, such as a virtualization administrator, can provide (e.g., via an application programming interface (API)) such storage policy profiles for the respective production and/or snapshot VVOLs. Further, each such storage policy profile can correspond to a set of capabilities and associated constraints that the SLA logic 116 (or any other suitable logic) can use to implement a desired configuration for the provisioning of storage resources within the data storage system 104.

The snapshot logic 118 can be configured to service backup requests for performing full or incremental backups of at least some of the data stored on the production VVOL. When the backup request is to be serviced on the production VVOL, the snapshot logic 118 can capture a snapshot of the production VVOL by storing, in a block map for the snapshot, metadata that refers to the original data blocks on the production VVOL (to which was assigned storage space from the storage devices in the "gold" storage tier 1). When both the production VVOL and a snapshot VVOL exist, and a write request is received to a data block on the production VVOL that is shared between the production VVOL and the snapshot VVOL, then the snapshot logic 118 can capture a snapshot of the production VVOL by redirecting the write request to newly allocated space for a data block on the production VVOL, writing new block data to the newly allocated space, and storing, in the block map for the snapshot, metadata that refers to the original, unmodified data block(s) on the production VVOL. In addition, based at least on an IO workload (e.g., a write IO workload, a read IO workload) of the data storage system 104, the snapshot logic 118 can copy, in a background process, at least the original version of the modified data block from the production VVOL to the snapshot VVOL (to which was assigned storage space from the storage devices in the "bronze" storage tier 2), and store, in the block map for the snapshot, metadata that refers to the original version of the modified data block on the snapshot VVOL. In this way, the desired service level objectives for production data and snapshot data can be satisfied, while mitigating the performance impact of an extra write (i.e., copy) operation. It is noted that a block map for the snapshot VVOL can be stored in the memory 112 or on a storage device in the storage tier 2. Likewise, a block map for the production VVOL can be stored in the memory 112 or on a storage device in the storage tier 1.

Figure 2:
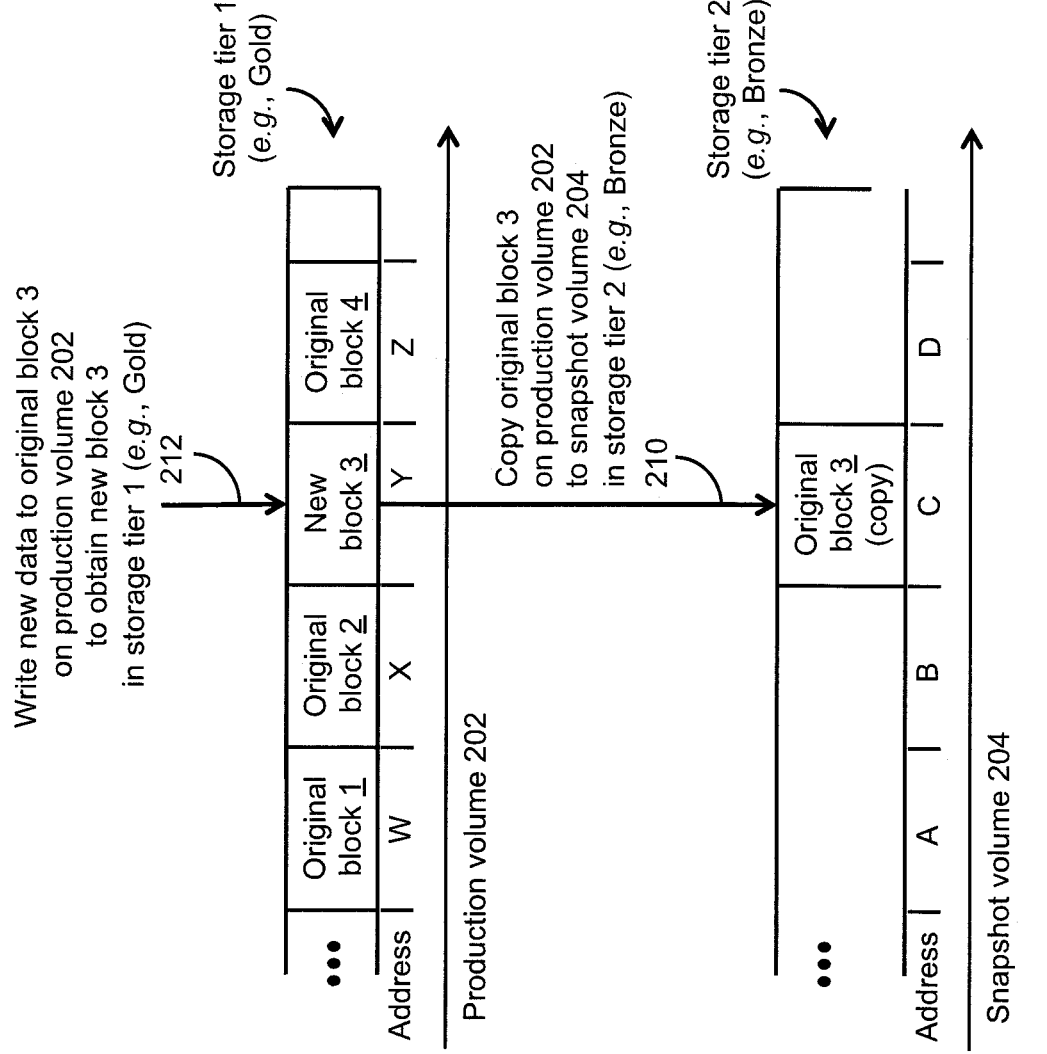
FIG. 2 is a block diagram illustrating a conventional "copy-on-write" operation, which can be performed to assure data integrity when capturing a snapshot of a production volume while receiving host-generated storage input/output (IO) requests.

FIG. 2 depicts, for purposes of illustration, a conventional "copy-on-write" operation that can be performed to assure data integrity when capturing a snapshot of a production volume while receiving host-generated storage IO requests (e.g., a write request, a read request). In the conventional copy-on-write operation of FIG. 2, it is assumed that a production volume 202 (e.g., a production VVOL) includes at least an original block "1", an original block "2", an original block "3", and an original block "4" stored at a logical address "W", a logical address "X", a logical address "Y", and a logical address "Z", respectively. It is further assumed that the production volume 202 is assigned storage space from at least one storage device in the "gold" storage tier 1 (see FIG. 1) based on a service level objective (SLO) for production data, and that a snapshot volume 204 (e.g., a snapshot VVOL) is assigned storage space from at least one storage device in the "bronze" storage tier 2 (see FIG. 1) based on an SLO for snapshot data.

At regular or periodic intervals, a request may be received for performing a full or incremental backup of at least some of the production data stored on the production volume 202 (see FIG. 2). When the backup request is received on the production volume 202, the copy-on-write operation can capture a snapshot of the production volume 202 by storing, in a data structure for the snapshot (e.g., a block map), metadata that refers to the original blocks 1, 2, 3, 4, and so on, on the production volume 202. When both the production volume 202 and the snapshot volume 204 exist, and a write request is received to an original data block (e.g., the original block 3) on the production volume 202 that is shared between the production volume 202 and the snapshot volume 204, then the copy-on-write operation can capture a snapshot of the production volume 202 by copying the original block 3 to newly allocated space for a data block on the snapshot volume 204 (e.g., a data block at a logical address "C"; see FIG. 2) in the "bronze" storage tier 2 (see also FIG. 2, reference numeral 210), writing new data to the original block 3 on the production volume 202 to obtain a new block "3" in the "gold" storage tier 1 (see FIG. 2, reference numeral 212), and storing, in a block map 208 for the snapshot, metadata that refers to the original, unmodified blocks 1, 2, 4 on the production volume 202, as well as metadata that refers to the copy of the original block 3 on the snapshot volume 204.

As shown in FIG. 2, the block map 208 for the snapshot volume 204 includes an entry for the original block 1 stored on the production volume 202 at the logical address W in the "gold" storage tier 1, an entry for the original block 2 stored on the production volume 202 at the logical address X in the "gold" storage tier 1, an entry for the original block 3 stored on the snapshot volume 204 at the logical address C in the "bronze" storage tier 2, and an entry for the original block 4 stored on the production volume 202 at the logical address Z in the "gold" storage tier 1. As further shown in FIG. 2, a block map 206 for the production volume 202 includes an entry for the original block 1 stored on the production volume 202 at the logical address W in the "gold" storage tier 1, an entry for the original block 2 stored on the production volume 202 at the logical address X in the "gold" storage tier 1, an entry for the new block 3 stored on the production volume 202 at a logical address "Y" in the "gold" storage tier 1, and an entry for the original block 4 stored on the production volume 202 at the logical address Z in the "gold" storage tier 1. Although the conventional copy-on-write operation of FIG. 2 has the disadvantage of a performance impact due to the need to perform an extra write (i.e., copy) operation, it has the advantage of allowing the production and snapshot volumes 202, 204 to be associated with the different storage tiers 1, 2, respectively, thereby allowing different service level objectives to be satisfied for the production and snapshot data.

Figure 3:
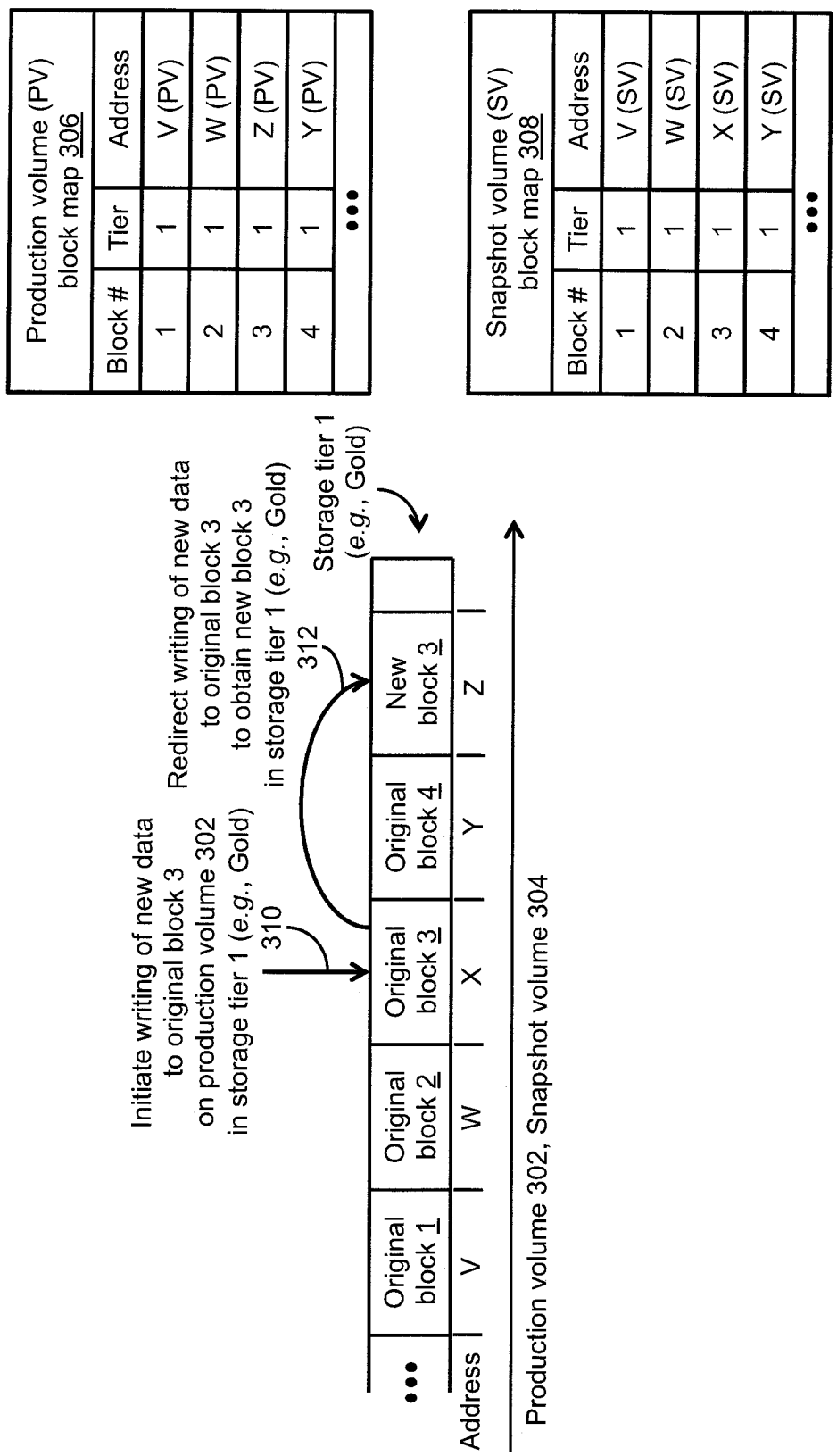
FIG. 3 is a block diagram illustrating a conventional "redirect-on-write" operation, which can also be performed to assure data integrity when capturing a snapshot of a production volume while receiving host-generated storage IO requests.

FIG. 3 depicts, for purposes of illustration, a conventional "redirect-on-write" operation that can also be performed to assure data integrity when capturing a snapshot of a production virtual volume while receiving host-generated storage IO requests (e.g., a write request, a read request). In the conventional redirect-on-write operation of FIG. 3, it is assumed that a production volume 302 (e.g., a production VVOL) includes at least an original block "1", an original block "2", an original block "3", and an original block "4" stored at a logical address "V", a logical address "W", a logical address "X", and a logical address "Y", respectively. It is further assumed that the production volume 302 is assigned storage space from at least one storage device in the "gold" storage tier 1 (see FIG. 1) based on a service level objective (SLO) for production data, and that the production volume 302 shares at least some of the same storage space in the "gold" storage tier 1 with a snapshot volume 304.

At regular or periodic intervals, a request may be received for performing a full or incremental backup of at least some of the production data stored on the production volume 302 (see FIG. 3). When the backup request is received on the production volume 302, the redirect-on-write operation can capture a snapshot of the production volume 302 by storing, in a block map for the snapshot, metadata that refers to the original blocks 1, 2, 3, 4, and so on, on the production volume 302. When both the production volume 302 and the snapshot volume 304 exist, and a write request is received to an original data block (e.g., the original block 3) on the production volume 302 that is shared between the production volume 302 and the snapshot volume 304, then the redirect-on-write operation can capture a snapshot of the production volume 302 by initiating the writing of new block data to the original block 3 on the production volume 302 (see FIG. 3, reference numeral 310), redirecting the writing of the new block data to newly allocated space for a data block on the production volume 302 (e.g., a data block at a logical address "Z"; see FIG. 3, reference numeral 312), writing the new block data to the newly allocated space at the logical address Z to obtain a new block "3" in the "gold" storage tier 1 (see also FIG. 3, reference numeral 312), and storing, in a block map 308 for the snapshot, metadata that refers to the original, unmodified data blocks 1, 2, 3, 4. As noted herein, the production volume 302 shares at least some of the same storage space in the "gold" storage tier 1 with the snapshot volume 304.

As shown in FIG. 3, the block map 308 for the snapshot volume 304 includes an entry for the original block 1 stored at the logical address V in the "gold" storage tier 1, an entry for the original block 2 stored at the logical address W in the "gold" storage tier 1, an entry for the original block 3 stored at the logical address X in the "gold" storage tier 1, and an entry for the original block 4 stored at the logical address Y in the "gold" storage tier 1. As further shown in FIG. 3, a block map 306 for the production volume 302 includes an entry for the original block 1 stored at the logical address V in the "gold" storage tier 1, an entry for the original block 2 stored at the logical address W in the "gold" storage tier 1, an entry for the new block 3 stored at the logical address Z in the "gold" storage tier 1, and an entry for the original block 4 stored at the logical address Y in the "gold" storage tier 1. Although the conventional redirect-on-write operation of FIG. 3 has the advantage of mitigating the performance impact of the conventional copy-on-write operation of FIG. 2, it has the disadvantage of requiring the production and snapshot data to share the same storage extent in the same storage tier (e.g., the "gold" storage tier 1; see FIG. 1), making it difficult if not impossible to satisfy different service level objectives for the production and snapshot data.

Figure 4:
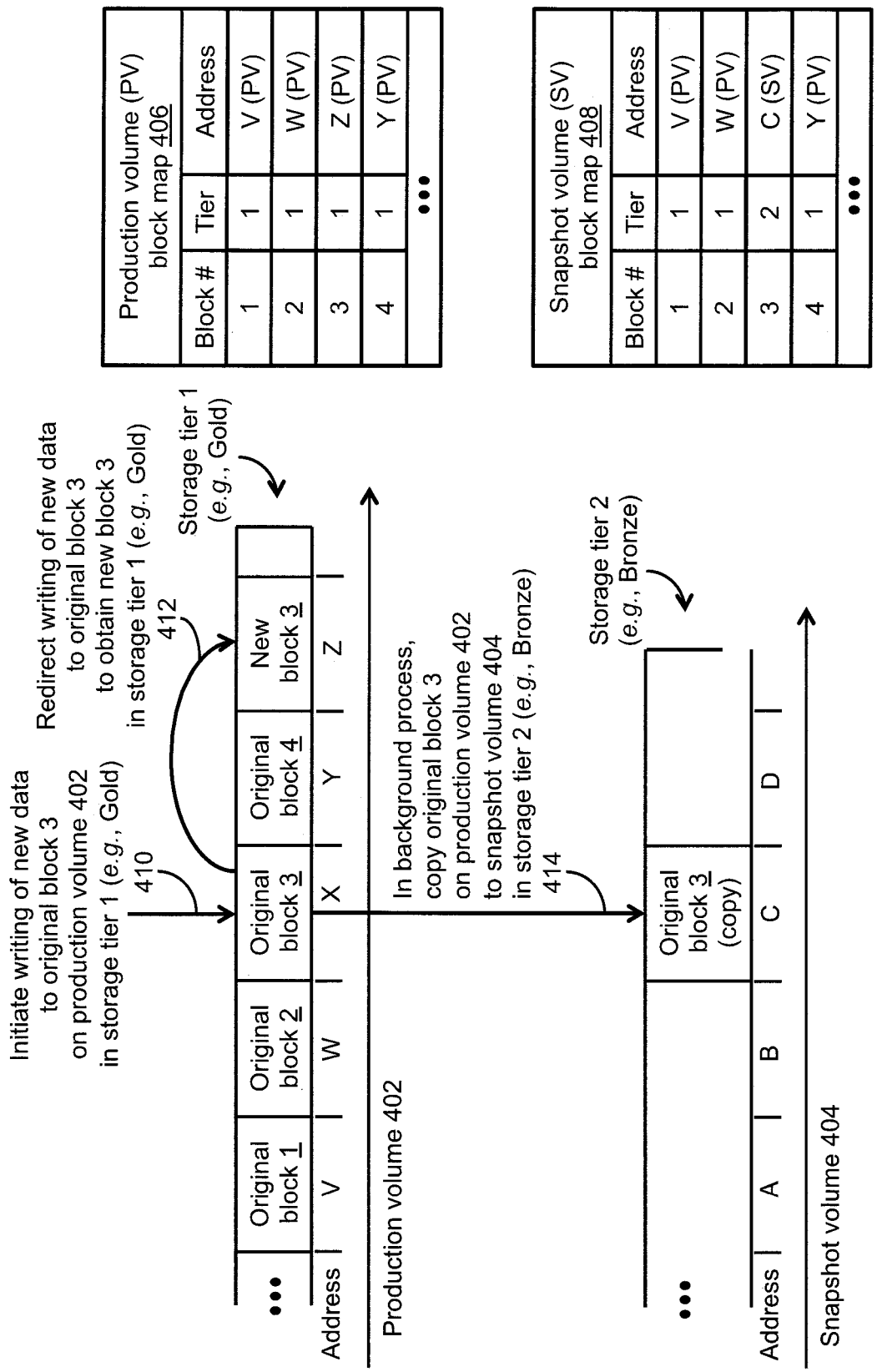
FIG. 4 is a block diagram illustrating a backup operation that can be performed by the data storage system of FIG. 1, taking into account the desired service level objectives for production and snapshot data.

The disclosed techniques for performing backup operations in a data storage system (e.g., the data storage system 104), taking into account desired service level objectives for production and snapshot data, will be further understood with reference to the following illustrative example, as well as FIGS. 1 and 4. In this example, it is assumed that a production volume 402 (e.g., a production VVOL) (see FIG. 4) includes at least an original block "1", an original block "2", an original block "3", and an original block "4" stored at a logical address "V", a logical address "W", a logical address "X", and a logical address "Y", respectively. It is further assumed that the storage processing circuitry 110 (see FIG. 1) executing the SLA logic 116 assigns, to the production volume 402, storage space from at least one storage device in the "gold" storage tier 1 based on a desired service level objective (SLO) for production data, as well as assigns, to a snapshot volume (e.g., a snapshot VVOL) (see FIG. 4) storage space from at least one storage device in the "bronze" storage tier 2 based on a desired SLO for snapshot data. It is noted that the SLO for the production data can be specified by a storage policy profile for the production volume 402, and that the SLO for the snapshot data can likewise be specified by a storage policy profile for the snapshot volume 404.

At regular or periodic intervals, the storage processing circuitry 110 receives a request for performing a full or incremental backup of at least some of the production data stored on the production volume 402 (see FIG. 4). When the storage processing circuitry 110 receives the backup request on the production volume 402, then the storage processing circuitry 110 executes the snapshot logic 118 to capture a snapshot of the production volume 402 by storing, in a block map for the snapshot, metadata that refers to the original blocks 1, 2, 3, 4, and so on, on the production volume 402. When both the production volume 402 and the snapshot volume 404 exist, and a write request is received to an original data block (e.g., the original block 3) on the production volume 402 that is shared between the production volume 402 and the snapshot volume 404, then the storage processing circuitry 110 executes the snapshot logic 118 to capture a snapshot of the production volume 402 by initiating the writing of new data to the original block 3 on the production volume 402 (see FIG. 4, reference numeral 410), redirecting the writing of the new data to newly allocated space for a data block on the production volume 402 (e.g., a data block at a logical address "Z"; see FIG. 4, reference numeral 412), writing the new block data to the newly allocated space at the logical address Z to obtain a new block "3" in the "gold" storage tier 1 (see also FIG. 4, reference numeral 412), and storing, in a block map for the snapshot, metadata that initially refers to the original, unmodified data blocks 1, 2, 3, 4 stored at the logical addresses V, W, X, Y, respectively, on the production volume 402.

In addition, based on an IO workload (e.g., a write IO workload, a read IO workload) or an idle state of the data storage system 104 (or periodically, or on a triggered basis), the storage processing circuitry 110 executes the snapshot logic 118 to copy, in a background process, the original block 3 from the production volume 402 in the "gold" storage tier 1 to newly allocated space for a data block on the snapshot volume 404 (e.g., a data block at a logical address "C"; see FIG. 4, reference numeral 414) in the "bronze" storage tier 2, and to store, in a block map 408 for the snapshot, metadata that refers to the original, unmodified blocks 1, 2, 4 on the production volume 402, as well as metadata that refers to the copy of the original block 3 on the snapshot volume 404. The storage processing circuitry 110 can monitor and/or detect a write (or read) IO workload of the data storage system 104 (e.g., write/read IOs per second; IOPS), compare the write (or read) IO workload to a predetermined IO workload threshold, and, if the detected write (or read) IO workload is less than (or equal to) the predetermined IO workload threshold, copy, in the background process, the original block 3 from the production volume 402 in the "gold" storage tier 1 to the newly allocated space at the logical address C on the snapshot volume 404 in the "bronze" storage tier 2 (see also FIG. 4, reference numeral 414).

In effect, the storage processing circuitry 110 performs a delayed movement of data of the original block 3 (and/or any other data block(s) of the production volume 402 subject to being modified by a write request(s)) at a time when the data storage system 104 is under a reduced IO workload, demoting the data of the original block 3 from the "gold" storage tier 1 to the "bronze" storage tier 2. If, at a later time, it is desired to restore the production volume 402 to its previous state, then the storage processing circuitry 110 can promote the data of the original block 3 (and/or any other data block(s) of the snapshot volume 404) from the "bronze" storage tier 2 to the "gold" storage tier 1. By delaying the movement of the data of the original block 3 from the "gold" storage tier 1 to the "bronze" storage tier 2, the performance impact of the conventional copy-on-write operation of FIG. 2 is mitigated, while allowing the production and snapshot volumes 402, 404 to be associated with the different storage tiers 1, 2, respectively, based on the desired service level objectives for production and snapshot data. It is noted that the disclosed techniques for performing backup operations in a data storage system can also be performed while taking into account desired service level objectives for production data on a production volume, as well as any suitable derivative data (e.g., snapshot data, full clone data, fast clone data) on any suitable derivative volume (e.g., a snapshot volume, a full clone volume, a fast clone volume).

As shown in FIG. 4, the block map 408 for the snapshot volume 404 includes an entry for the original block 1 stored on the production volume 402 at the logical address V in the "gold" storage tier 1, an entry for the original block 2 stored on the production volume 402 at the logical address W in the "gold" storage tier 1, an entry for the original block 3 stored on the snapshot volume 404 at the logical address C in the "bronze" storage tier 2, and an entry for the original block 4 stored on the production volume 402 at the logical address Y in the "gold" storage tier 1. As further shown in FIG. 4, a block map 406 for the production volume 402 includes an entry for the original block 1 stored on the production volume 402 at the logical address V in the "gold" storage tier 1, an entry for the original block 2 stored on the production volume 402 at the logical address W in the "gold" storage tier 1, an entry for the new block 3 stored on the production volume 402 at a logical address "Z" in the "gold" storage tier 1, and an entry for the original block 4 stored on the production volume 402 at the logical address Y in the "gold" storage tier 1.

Figure 5:
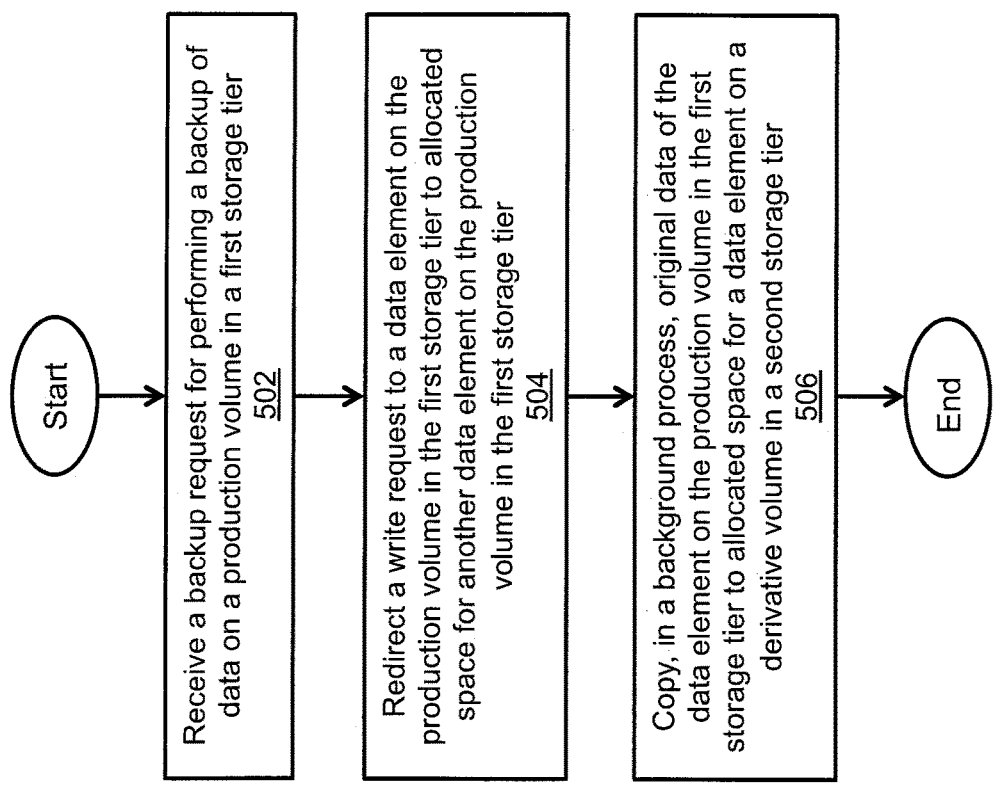
FIG. 5 is a flow diagram of an exemplary method of performing the backup operation of FIG. 4.

An exemplary method of performing backup operations in data storage systems, taking into account desired service level objectives for production and derivative data, is described below with reference to FIG. 5. As depicted in block 502, a backup request is received for performing a backup of data on a production volume in a first storage tier. As depicted in block 504, a write request to a data element on the production volume in the first storage tier is redirected to allocated space for another data element on the production volume in the first storage tier. As depicted in block 506, original data of the data element on the production volume in the first storage tier is copied, in a background process, to allocated space for a data element on a derivative volume in a second storage tier.

Several definitions of terms are provided below for the sole purpose of aiding understanding of the foregoing description, as well as the claims set forth hereinbelow.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drivers (SSDs), flash devices (e.g., NAND flash devices, NOR flash devices), and similar devices that may be accessed locally and/or remotely (e.g., via a storage attached network (SAN)). A storage array (or disk array) may refer to a data storage system used for block-based, file-based, or object storage, in which storage arrays can include, for example, dedicated storage hardware containing spinning hard disk drives (HDDs), solid state disk drives, and/or all-flash drives. A data storage entity may be any one or more of a file system, object storage, a virtualized device, a logical unit (LU), a logical unit number (LUN), a logical volume, a logical device, a physical device, and/or a storage medium. A logical unit (LU) may be a logical entity provided by a storage system for accessing data from the storage system. A logical unit (LU) is used interchangeably with a logical volume. A LU or LUN may be used interchangeably with each other. A LUN may be a logical unit number for identifying a logical unit, and may also refer to one or more virtual disks or virtual LUNs, which may correspond to one or more virtual machines. A physical storage unit may be a physical entity, such as a disk or an array of disks, for storing data in storage locations that can be accessed by address, in which a physical storage unit is used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and other types and/or combinations of computer readable storage media. A storage medium may also refer to both physical and logical storage media, and may include multiple levels of virtual-to-physical mappings, and may be or include an image or disk image. A storage medium may be computer-readable, and may also be referred to as a computer-readable program medium.

As employed herein, the term "IO request" or simply "IO" may be used to refer to an input or output request, such as a data read request or a data write request.

As employed herein, the terms, "such as," "for example," "e.g.," "exemplary," and variants thereof, describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of performing a backup operation in a data storage system, comprising:

receiving, from a virtualization administrator, a first storage policy profile and a second storage policy profile, the first storage policy profile specifying a first service level objective (SLO) for data stored on a production virtual volume (VVOL), the second storage policy profile specifying a second SLO for data stored on a derivative VVOL;

assigning, to the production VVOL, storage space from at least one storage device in a first storage tier based on the first SLO specified by the first storage policy profile received from the virtualization administrator, the production VVOL including a first data element and a second data element;

assigning, to the derivative VVOL, storage space from at least one storage device in a second storage tier based on the second SLO specified by the second storage policy profile received from the virtualization administrator;

sharing the first data element included in the production VVOL in the first storage tier with the derivative VVOL in the second storage tier, the first data element containing original data;

receiving a write request to write new data to the first data element on the production VVOL in the first storage tier;

in response to receiving the write request to write new data to the first data element on the production VVOL in the first storage tier, redirecting the write request to the second data element on the production VVOL in the first storage tier;

in response to redirecting the write request, writing the new data to the second data element on the production VVOL;

monitoring an input/output (IO) workload of the data storage system; and continuing monitoring the IO workload and sharing the first data element until the IO workload of the data storage system is less than a predetermined threshold.

2. The method of claim 1 wherein the derivative VVOL includes a third data element, and wherein the method further comprises:

in response to determining, from the monitoring of the IO workload, that the IO workload is less than the predetermined threshold:

discontinuing sharing the first data element; and demoting the original data contained in the first data element on the production VVOL from the first storage tier to the third data element on the derivative VVOL in the second storage tier.

3. The method of claim 2 further comprising:

storing, in a block map for the derivative VVOL, metadata that refers to the third data element on the derivative VVOL in the second storage tier.

4. The method of claim 2 further comprising:

prior to determining that the IO workload of the data storage system is less than the predetermined threshold, storing first metadata in a block map for the derivative VVOL, the first metadata referring to the original data contained in the first data element on the production VVOL; and having determined that the IO workload of the data storage system is less than the predetermined threshold, storing second metadata in the block map for the derivative VVOL, the second metadata referring to the original data contained in the third data element on the derivative VVOL.

5. The method of claim 2 wherein demoting the original data includes copying, in a background process, the original data contained in the first data element on the production VVOL to the third data element on the derivative VVOL in response to determining that the IO workload of the data storage system is less than the predetermined threshold.

6. The method of claim 1 further comprising:

storing, in a block map for the production VVOL, metadata that refers to the second data element on the production VVOL in the first storage tier.

7. The method of claim 1 further comprising:

receiving a backup request for performing an incremental backup of the data stored on the production VVOL in the first storage tier.

8. A data storage system, comprising:

a memory; and processing circuitry configured to execute program instructions out of the memory to:

receive, from a virtualization administrator, a first storage policy profile and a second storage policy profile, the first storage policy profile specifying a first service level objective (SLO) for data stored on a production virtual volume (VVOL), the second storage policy profile specifying a second SLO for data stored on a derivative VVOL;

assign, to the production VVOL, storage space from at least one storage device in a first storage tier based on the first SLO specified by the first storage policy profile received from the virtualization administrator, the production VVOL including a first data element and a second data element;

assign, to the derivative VVOL, storage space from at least one storage device in a second storage tier based on the second SLO specified by the second storage policy profile received from the virtualization administrator;

share the first data element included in the production VVOL in the first storage tier with the derivative VVOL in the second storage tier, the first data element containing original data;

receive a write request to write new data to the first data element on the production VVOL in the first storage tier;

in response to receipt of the write request to write new data to the first data element on the production VVOL in the first storage tier, redirect the write request to the second data element on the production VVOL in the first storage tier;

in response to redirecting the write request, write the new data to the second data element on the production VVOL;

monitor an input/output (IO) workload of the data storage system; and continue to monitor the IO workload and to share the first data element until the IO workload of the data storage system is less than a predetermined threshold.

9. The data storage system of claim 8 wherein the derivative VVOL includes a third data element, and wherein the processing circuitry is further configured to execute the program instructions out of the memory to:

in response to determining, from the monitoring of the IO workload, that the IO workload is less than the predetermined threshold:

discontinuing sharing the first data element; and
demoting the original data contained in the first data element on the production VVOL from the first storage tier to the third data element on the derivative VVOL in the second storage tier; and
store, in a block map for the derivative VVOL, metadata that refers to the third data element on the derivative VVOL in the second storage tier.

10. The data storage system of claim 8 wherein the processing circuitry is further configured to execute the program instructions out of the memory to store, in a block map for the production VVOL, metadata that refers to the second data element on the production VVOL in the first storage tier.

11. The data storage system of claim 8 wherein the derivative VVOL is one of a snapshot VVOL, a full clone VVOL, and a fast clone VVOL.

12. A computer program product including a set of non-transitory, computer-readable media having instructions that, when executed by control circuitry of a computerized apparatus, cause the control circuitry to perform a method of performing a backup operation in a data storage system, the method comprising:
receiving, from a virtualization administrator, a first storage policy profile and a second storage policy profile, the first storage policy profile specifying a first service level objective (SLO) for data stored on a production virtual volume (VVOL), the second storage policy profile specifying a second SLO for data stored on a derivative VVOL;
assigning, to the production VVOL, storage space from at least one storage device in a first storage tier based on the first SLO specified by the first storage policy profile received from the virtualization administrator, the production VVOL including a first data element and a second data element;
assigning, to the derivative VVOL, storage space from at least one storage device in a second storage tier based on the second SLO specified by the second storage policy profile received from the virtualization administrator, the derivative VVOL including a third data element;
sharing the first data element included in the production VVOL in the first storage tier with the derivative VVOL in the second storage tier, the first data element containing original data;
receiving a write request to write new data to the first data element on the production VVOL in the first storage tier;
in response to receiving the write request to write new data to the first data element on the production VVOL in the first storage tier, redirecting the write request to the second data element on the production VVOL in the first storage tier;
in response to redirecting the write request, writing the new data to the second data element on the production VVOL;
monitoring an input/output (IO) workload of the data storage system; and
continuing monitoring the IO workload and sharing the first data element until the IO workload of the data storage system is less than a predetermined threshold.

* * * * *